United States Patent [19]
Hase et al.

[11] Patent Number: 5,839,718
[45] Date of Patent: Nov. 24, 1998

[54] LONG PERSISTENT PHOSPHORESCENCE PHOSPHOR

[75] Inventors: Takashi Hase, Succasunna; Susumu Omatoi, Morris Township, both of N.J.; Takao Ouchi, Ninomiya-machi, Japan

[73] Assignees: USR Optonix Inc., Hackettstown, N.J.; Kasei Optonix, Ltd., Odawara, Japan

[21] Appl. No.: 898,424

[22] Filed: Jul. 22, 1997

[51] Int. Cl.[6] ............................ C09K 11/59; C09K 11/66; C09K 11/06
[52] U.S. Cl. ............................ 252/301.4 F; 252/301.6 F; 252/301.33; 428/403; 428/407
[58] Field of Search ..................... 252/301.4 F, 301.6 R, 252/301.33; 428/407, 403

[56] References Cited

U.S. PATENT DOCUMENTS

| | | | |
|---|---|---|---|
| 1,096,644 | 5/1914 | Saubermann | 252/310.33 |
| 3,544,481 | 12/1970 | Barry | 252/301.4 F |
| 4,211,813 | 7/1980 | Gravisse et al. | 252/301.33 |

FOREIGN PATENT DOCUMENTS

| | | | |
|---|---|---|---|
| 60-170194 | 9/1985 | Japan | 252/301.33 |
| 9-194833 | 7/1997 | Japan . | |
| 2171112 | 8/1986 | United Kingdom | 252/301.4 F |

*Primary Examiner*—Melissa Bonner
*Attorney, Agent, or Firm*—Oblon, Spivak, McClelland, Maier & Neustadt, P.C.

[57] ABSTRACT

A long persistent phosphorescence phosphor contains a europium-activated long persistent phosphorescence silicate phosphor of the formula (I), $$m(Sr_{1-a}M^1_a)O \cdot n(Mg_{1-b}M^2_b)O \cdot 2(Si_{1-c}Ge_c)O_2:Eu_xLn_y \qquad (I)$$

containing at least one halogen atom in a specific amount, and an organic fluorescent pigment which is deposited on the surface of the europium-activated long persistent silicate phosphor.

19 Claims, 5 Drawing Sheets

LONG PERSISTENT PHOSPHORESCENCE PHOSPHOR

BACKGROUND OF THE INVENTION

1. Field of the Invention

The present invention relates to a long persistent phosphorescence phosphor which comprises a europium activated long persistent phosphorescence silicate phosphor and an organic fluorescent pigment which is deposited on the surface of the europium-activated long persistent silicate phosphor. This long persistent phosphorescence phosphor, when excited by absorbing ultraviolet light and/or visible light, is capable of emitting blue to red light, with exceedingly long afterglow characteristics and excellent weather resistance, and therefore is suitable for a wide variety of applications as displays and light sources in dark places, not only indoors, but also outdoors, and even in water.

1. Discussion of Background

A long persistent phosphorescence phosphor is a substance that is capable of luminescence from excitation and continues to emit light after excitation. In accordance with the recent demand for multi-colored and multi-functional display devices, there is a keen interest for a long persistent phosphorescence phosphor that is capable of emitting multi-color light, with exceedingly long afterglow characteristics and improved weather resistance, for use in the above-mentioned multi-colored and multi-functional display devices.

This is because conventional long persistent phosphorescence phosphors have the shortcomings that the color of light that can be emitted, the color of the afterglow, and the body color of the phosphors are extremely limited in terms of the type, the weather resistance thereof is poor, and the duration of the afterglow is short.

A (Ca,Sr)S:Bi phosphor is known as a blue-light emitting long persistent phosphorescence phosphor; a ZnS:Cu phosphor and a $SrAl_2O_4$:Eu, Dy phosphor are known as yellow green light emitting long persistent phosphorescence phosphors; and a (Zn,Cd)S:Cu phosphor is known as a red light emitting long persistent phosphorescence phosphor.

The above-mentioned (Ca,Sr)S:Bi phosphor, however, is rarely used currently because the host material thereof (Ca,Sr)S exhibits extreme chemical instability and the luminescence brightness and afterglow characteristics thereof are insufficient for practical use.

The (Zn,Cd)S:Cu phosphor is also rarely used currently since Cd is toxic and makes up almost half of the host material (Zn,Cd)S thereof, and the luminescence brightness and afterglow characteristics of the phosphor are insufficient for practical use.

The ZnS:Cu phosphor does not have satisfactory afterglow characteristics and tends to be decomposed in the presence of moisture when exposed to ultraviolet light and to become darkened. However, the ZnS:Cu phosphor is so inexpensive that it is widely used, for example, in clock dials and indoor displays for emergency evacuation.

The $SrAl_2O_4$:Eu,Dy phosphor, which has recently been developed, exhibits good long persistent afterglow characteristics. However, the $SrAl_2O_4$:Eu,Dy phosphor emits a yellow green light and therefore cannot excite blue fluorescent pigments, so that it is impossible to prepare a long persistent phosphorescence phosphor having a blue body color, using the $SrAl_2O_4$:Eu,Dy phosphor. When the $SrAl_2O_4$:Eu,Dy phosphor is used in combination with a red fluorescent pigment, the yellow green light emitted from the phosphor and the red light from the fluorescent pigment are mixed, so that no pure red light is emitted therefrom.

SUMMARY OF THE INVENTION

It is therefore an object of the present invention to provide a long persistent phosphorescence phosphor which has excellent long persistent afterglow characteristics and is capable of emitting light from the blue to red spectrum, with high chemical stability and excellent weather resistance, assuming a body color corresponding to the color of the light emitted therefrom, with the shortcomings of the above-mentioned conventional phosphors being completely eliminated therefrom.

The above object of the present invention can be achieved by a long persistent phosphorescence phosphor which comprises (i) a europium-activated long persistent phosphorescence silicate phosphor of the formula (I),

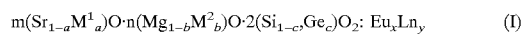

$$m(Sr_{1-a}M^1{}_a)O \cdot n(Mg_{1-b}M^2{}_b)O \cdot 2(Si_{1-c}Ge_c)O_2: Eu_xLn_y \qquad (I)$$

wherein $M^1$ is Ba, $M^2$ is at least one element selected from the group consisting of Be, Zn and Cd, Ln is at least one element selected from the group consisting of Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn, $m(Sr_{1-a}M^1{}_a)O \cdot n(Mg_{1-b}M^2{}_b)O \cdot 2(Si_{1-c}Ge_c)O_2$ being a host material for the phosphor, Eu serving as an activator, and Ln serving as a coactivator, wherein
$0 \leq a \leq 0.8$,
$0 \leq b \leq 0.2$,
$0 \leq c \leq 0.2$,
$1.5 \leq m \leq 3.5$,
$0.5 \leq n \leq 1.5$,
$1 \times 10^{-5} \leq x \leq 1 \times 10^{-1}$ (g·atm per mole of the host material),
$1 \times 10^{-5} \leq y \leq 1 \times 10-1$ (g·atm per mole of the host material), containing at least one halogen atom selected from the group consisting of F, Cl, Br and I in an amount of $1 \times 10^{-5}$ to $1 \times 10^{-1}$ g·atm per mole of the host material, and (ii) an organic fluorescent pigment which is deposited on the surface of the europium-activated long persistent silicate phosphor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
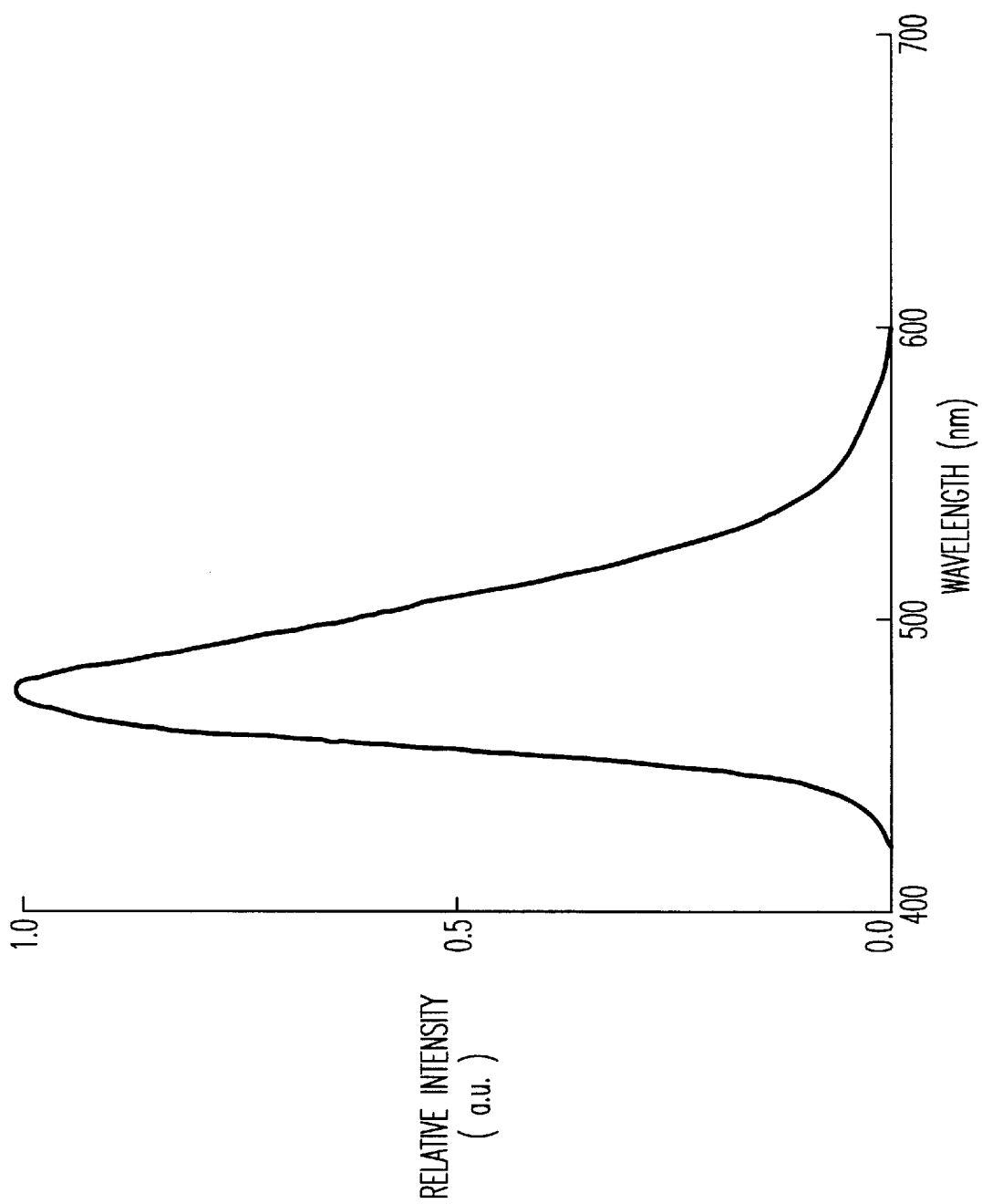
FIG. 1 is a luminescence spectrum of a europium activated long persistent silicate phosphor employed in Example 1 of the present invention, when excited with an ultraviolet light with a wavelength of 365 um.

For obtaining a long persistent phosphorescence phosphor, the inventors of the present invention studied mainly host materials with a composition formula (A):

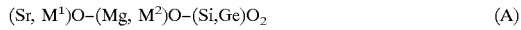

$$(Sr, M^1)O-(Mg, M^2)O-(Si,Ge)O_2 \quad (A)$$

wherein $M^1$ is Ba, $M^2$ is at least one element selected from the group consisting of Be, Zn and Cd. As a result, it was discovered that in the above host materials, a host material with a particular composition is suitable for obtaining long persistent afterglow, that is, a material with the following composition formula (B):

$$m(Sr, M^1)O \cdot n(Mg, M^2)O \cdot 2(Si, Ge)O_2 \quad (B)$$

wherein $1.5 \leq m \leq 3.5$, and $0.5 \leq n \leq 1.5$.

The host material is activated by Eu and also co-activated by Ln, which is at least one element selected from the group consisting of Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn, and by containing therein a halogen atom selected from the group consisting of F, Cl, Br and L, the luminescence center (Eu) and the contained elements can be successfully optimized, whereby a europium activated long persistent phosphorescence silicate phosphor having extremely long persistent afterglow characteristics, high chemical stability and weather resistance, can be obtained, which is hereinafter referred to as the silicate phosphor.

Of the co-activators (Ln), Dy, Nd, Tm, Sn, In and Bi are particularly suitable for use in the present invention.

In the composition formula (B), the substitution amount "a" of $M^1$ for Sr is in the range of $0 \leq a \leq 0.8$, preferably in the range of $0 \leq a \leq 0.4$. When the substitution amount "a" of $M^1$ for Sr exceeds 0.8, the affect of improving the afterglow characteristics is reduced.

Furthermore, the substitution amount "b" of $M^2$ for Mg is in the range of $0 \leq b \leq 0.2$, preferably in the range of $0 \leq b \leq 0.1$. Also when the substitution amount "b" of $M^2$ for Mg exceeds 0.2, the effect of improving the afterglow characteristics is reduced.

Furthermore, the substitution amount "c" of Ge for Si is in the range of $0 \leq c \leq 0.2$, preferably in the range of $0 \leq c \leq 0.1$. When the substitution amount "c" of Ge for Si exceeds 0.2, the effect of improving the afterglow characteristics is reduced and the luminescence brightness of the silicate phosphor is decreased.

With respect to the ratio of the constituents for the host material, $m(Sr, M^1)O$, $n(Mg, M^2)O$, and $2(Si, Ge)O_2$, m and n are respectively in the range of $1.5 \leq m \leq 3.5$ and $0.5 \leq n \leq 1.5$, preferably in the range of $1.7 \leq m \leq 3.3$ and $0.7 \leq n \leq 1.3$.

When the above constituents are contained out of the above-mentioned respective ranges, undesired materials are formed or oxides used as starting materials for producing the silicate phosphor remain, so that the luminescence brightness is lowered.

The amount x of the activator, Eu, is in the range of $1 \times 10^{-5}$ to $1 \times 10^{-1}$ (g·atm per mole of the host material), preferably in the range of $1 \times 10^{-4}$ to $5 \times 10^{-2}$ (g·atm per mole of the host material). When the amount of Eu is less than $1 \times 10^{-5}$ (g·atm per mole of the host material), the number of luminescence centers is reduced, so that the desired luminescence brightness cannot be obtained, while when the amount of Eu is more than $1 \times 10^{-1}$ (g·atm per mole of the host material), the luminescence brightness is also lowered and the afterglow characteristics are impaired due to the occurrence of the concentration quenching.

The amount y of the co-activator Ln is in the range of $1 \times 10^{-5}$ to $1 \times 10^{-1}$ (g·atm per mole of the host material), preferably, in the range of $1 \times 10^{-4}$ to $5 \times 10^{-2}$ (g·atm per mole of the host material). When the amount of Ln is less than $1 \times 10^{-5}$ (g·atm per mole of the host material), the afterglow characteristics are lost, while when the amount of the Ln exceeds $1 \times 10^{-1}$ (g·atm per mole of the host material), light emission is caused to take place by the coactivator itself, so that the light emission in a blue color region cannot be obtained.

The halogen atom added to the phosphor of the host material for use in the present invention partly works as a flux for the improvement of the growth of the crystals and the diffusion of the activator (Eu) and the co-activator (Ln), whereby the luminescence brightness and the afterglow characteristics are significantly improved.

The amount z of the halogen atom, when measured by an analysis after washing treatment of the silicate phosphor, is in the range of $1 \times 10^{-5}$ to $1 \times 10^{-1}$ (g·atm per mole of the host material), preferably, in the range of $1 \times 10^{-4}$ to $1 \times 10^{-2}$ (g·atm per mole of the host material). When the amount z of the halogen atom is less than $1 \times 10^{-5}$ (g·atm per mole of the host material), problems such as the lowering of the instantaneous luminescence brightness and the impairing of the afterglow characteristics are caused, while when the amount z of the halogen atom exceeds $1 \times 10^{-1}$ (g·atm per one mole of the host material), the silicate phosphor is sintered so that it becomes difficult to pulverize the silicate phosphor.

The term "long persistent phosphorescence phosphor" is known to those of ordinary skill in the art. Generally, a long persistent phosphorescence phosphor will have a one tenth persistence time of 1 sec or more.

To the thus prepared silicate phosphor which is, for example, in the form of particles, an organic fluorescent pigment, which may be from blue to red in color, is added and deposited on the surface of the silicate phosphor, whereby there can be obtained a long persistent phosphorescence phosphor of the present invention.

More specifically, the long persistent phosphorescence phosphor of the present invention can be synthesized as follows:

The constituents for the silicate phosphor, namely, the constituents for the host material, Sr, $M^1$(=Ba), Mg, $M^2$(=Be, Zn or Cd), Si and Ge, the activator Eu, and the coactivator Ln may be respectively employed in the form of an oxide or in the form of a salt, such as the corresponding carbonate, nitrate, or chloride, which can be easily converted into the respective oxides.

The halogen may be employed in the form of ammonium salt, alkali salt, or a halogen compound of any of the above-mentioned elements for the constituents for the host material, the activator Eu, and the co-activator Ln.

The above-mentioned starting materials may be collected stoichiometrically so as to meet the composition of the above-mentioned silicate phosphor, and sufficiently mixed in a wet system or a dry system. The rare earth starting materials may be mixed by co-precipitation.

This mixture may be then placed in a heat-resistant container such as an aluminum crucible and fired in a reducing atmosphere of a hydrogen-containing neutral gas (e.g. $N_2$ or Ar) or in a carbon reducing atmosphere at 800° C. to 1,400° C. for 1 to 12 hours. When such firing is performed a plurality of times, the final firing has to be carried out in the reduction atmosphere.

The fired product is then ground, washed with a weak mineral acid and water, dried, and screened, whereby the silicate phosphor for use in the present invention is obtained.

The thus obtained silicate phosphor is mixed or kneaded with a blue to red organic fluorescent pigment, for instance, together with polyvinyl alcohol, whereby the long persistent phosphorescence phosphor of the present invention is prepared.

The phrase blue to red organic fluorescent pigment comprises fluorescent pigments which are individually blue, green, yellow and red.

As the fluorescent pigments for use in the present invention, conventional fluorescent pigments known to those of ordinary skill in the art may be used. Non-limiting examples include rhodamine, eosine, basic yellow SIN-LOIHI COLOR F-13™ made by Shinloihi Corp., P6-BL0519™ made by Magruder Color Company, Ltd., SINLOIHI COLOR FZ-5012™ made by Shinloihi Corp and SINLOIHI COLOR F-15™ made by Shinloihi Corp. The preparation of such fluorescent pigments is conventionally known to those of ordinary skill in the art by conventional methods.

In the present invention, it is preferable that the parts-by-weight ratio of the silicate phosphor to the organic fluorescent pigment be in the range of 100:30 or less, more preferably 100:20 or less and even more preferably 100:1 to 100:10. In the range of less than 1% in blending ratio, the body color is not deep enough and the blue luminescent becomes more intense and hurts the purity of luminescent color. At a blending ratio of above 30 wt %, the luminescence or phosphorescence of the phosphor is not strong enough and enough glow from the pigment could be not achieved.

It may be possible that the particle size of the organic fluorescent pigment is equivalent to or larger than that of the europium activated phosphorescent silicate phosphor. The organic fluorescent pigment may even be the plastic film containing the europium activated phosphorescent silicate phosphor.

Furthermore, when the silicate phosphor and the organic fluorescent pigment are in the form of particles, it is preferable that the silicate phosphor have an average particle size at least 5 times the average particle size of the organic fluorescent pigment.

It is preferable that the silicate phosphor have an average particle size of 5 to 100 μm, more preferably 5 to 50 μm, further more preferably 8 to 40 μm. Average particle size determinations may be made using a sieving technique and is indicated by passage and retention through a mesh. For a given average particle size range, 90% or more of the material will pass through a mesh defining the upper limit and be retained by a mesh defining the lower limit.

FIG. 1 is a luminescence spectrum of a europium activated long persistent phosphorescence silicate phosphor with a composition formula of $Sr_{1.995}MgSi_2O_7{:}Eu_{0.005}$, $Dy_{0.025},Cl_{0.025}$ for use in the present invention, which was employed in Example 1, when excited with an ultraviolet light with a wavelength of 365 nm.

Figure 2:
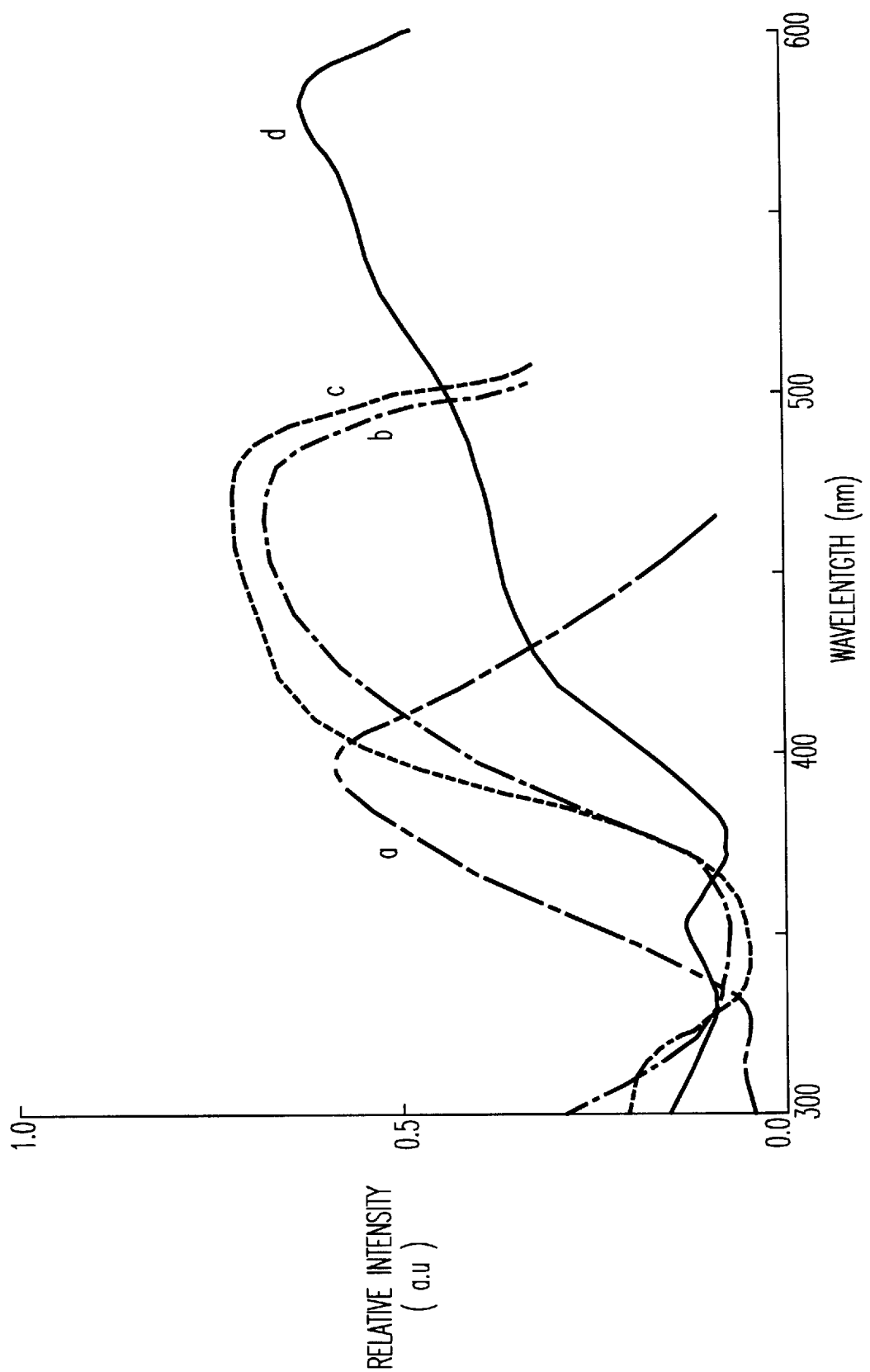
FIG. 2 is a graph showing an excitation spectrum at the luminescence spectrum peak of each of a blue fluorescent pigment, a green fluorescent pigment, a yellow fluorescent pigment and a red fluorescent pigment for use in the present invention.

FIG. 2 is a graph showing an excitation spectrum region of a blue fluorescent pigment, indicated by a curve "a", an excitation spectrum region of a green fluorescent pigment, indicated by a curve "b", an excitation spectrum region of a yellow fluorescent pigment indicated by a curve "c", and an excitation spectrum region of a red fluorescent pigment, indicated by a curve "d", each of which fluorescent pigments can be deposited on a europium-activated long persistent phosphorescence silicate phosphor for use in the present invention.

The region of the excitation spectrum of each of the above pigments was measured by a spectrophotometer in such a manner that the excitation wavelength of the light for irradiation of each pigment sample was changed, with the spectral wavelength at an output side of the spectrophotometer being fixed at the luminescence peak wavelength of each pigment, and the output intensity of the luminescence peak of each pigment was plotted, with the relative intensity of the luminescence peak as ordinate and the wavelength of the excitation light for scanning as abscissa.

Figure 3:
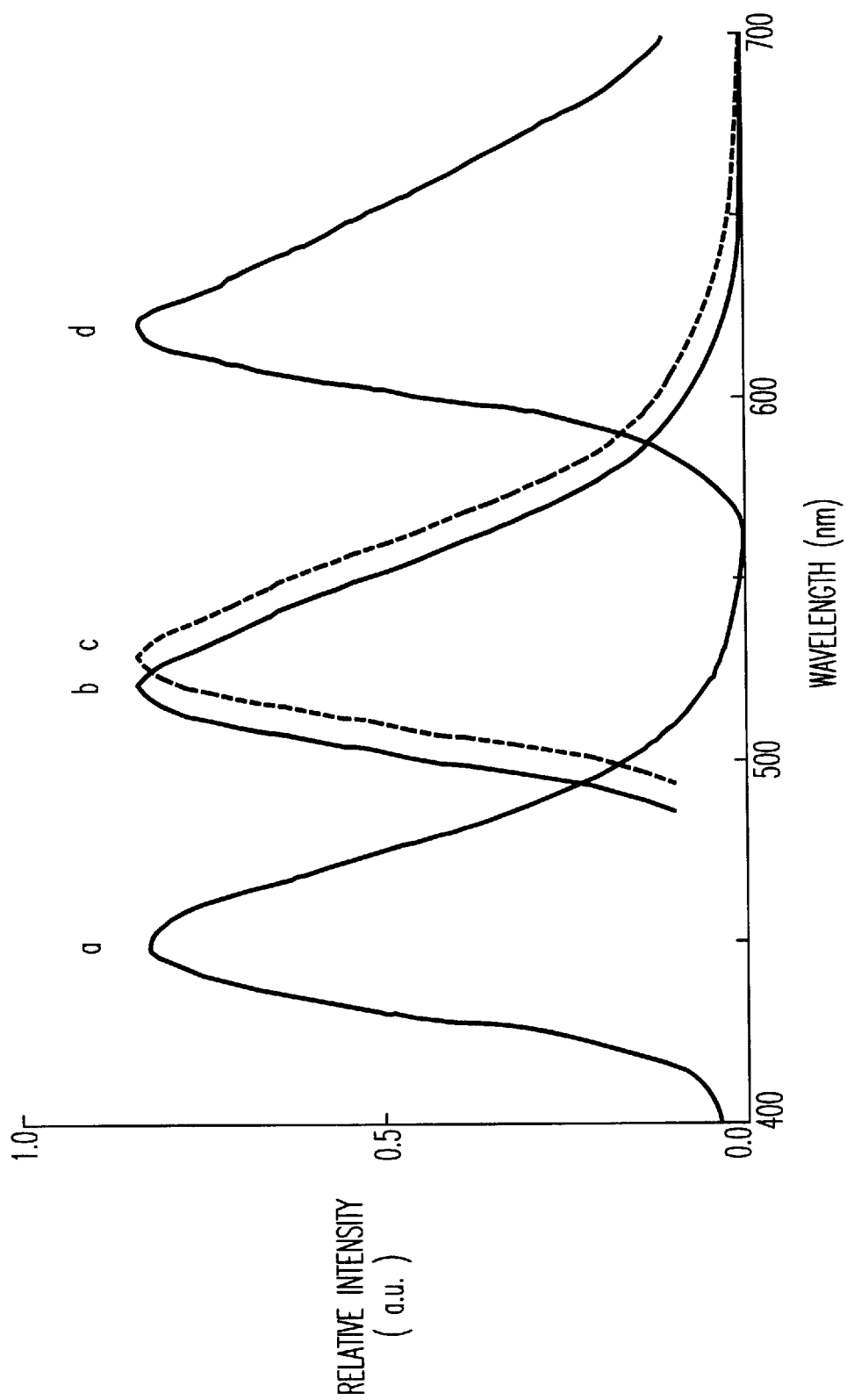
FIG. 3 is a graph showing a luminescence spectrum at 440 nm blue luminescence excitation of each of a blue fluorescent pigment, a green fluorescent pigment, a yellow fluorescent pigment and a red fluorescent pigment for use in the present invention.

FIG. 3 is a graph showing a luminescence spectrum of a blue fluorescent pigment, indicated by a curve "a" a luminescence spectrum of a green fluorescent pigment, indicated by a curve "b", a luminescence spectrum of a yellow fluorescent pigment indicated by a curve "c", and a luminescence spectrum of a red fluorescent pigment, indicated by a curve "d", each of which fluorescent pigments can be deposited on a europium-activated long persistent phosphorescence silicate phosphor for use in the present invention.

In the present invention, the above-mentioned blue to red fluorescent pigments may be excited, using the europium-activated long persistent phosphorescence silicate phosphor, and light is emitted from each of the fluorescent pigments. Furthermore, the silicate phosphor itself exhibits long persistent phosphorescence, so that the pigments also exhibit long persistent phosphorescence.

In order to obtain the above-mentioned effects, it is preferable, for instance, that (a) the luminescence spectrum distribution of the long persistent silicate phosphor be positioned at a shorter wavelength side with respect to the excitation spectrum distribution of the fluorescent pigments, (b) that the luminescence intensity of the long persistent silicate phosphor be sufficiently high and the duration of the afterglow thereof be sufficiently long for use in practice, and (c) that the excitation spectrum distribution of the fluorescent pigments be extended up to a blue color region and the luminescence efficiency be high.

A red fluorescent pigment could be excited by using a green-light emitting long persistent silicate phosphor, but it is evidently better to use a blue-light emitting long persistent silicate phosphor than a green-light emitting long persistent silicate phosphor from the view-point of the purity of the finally emitted light, since the finally emitted light contains the light emitted from the long persistent silicate phosphor itself.

Figure 4:
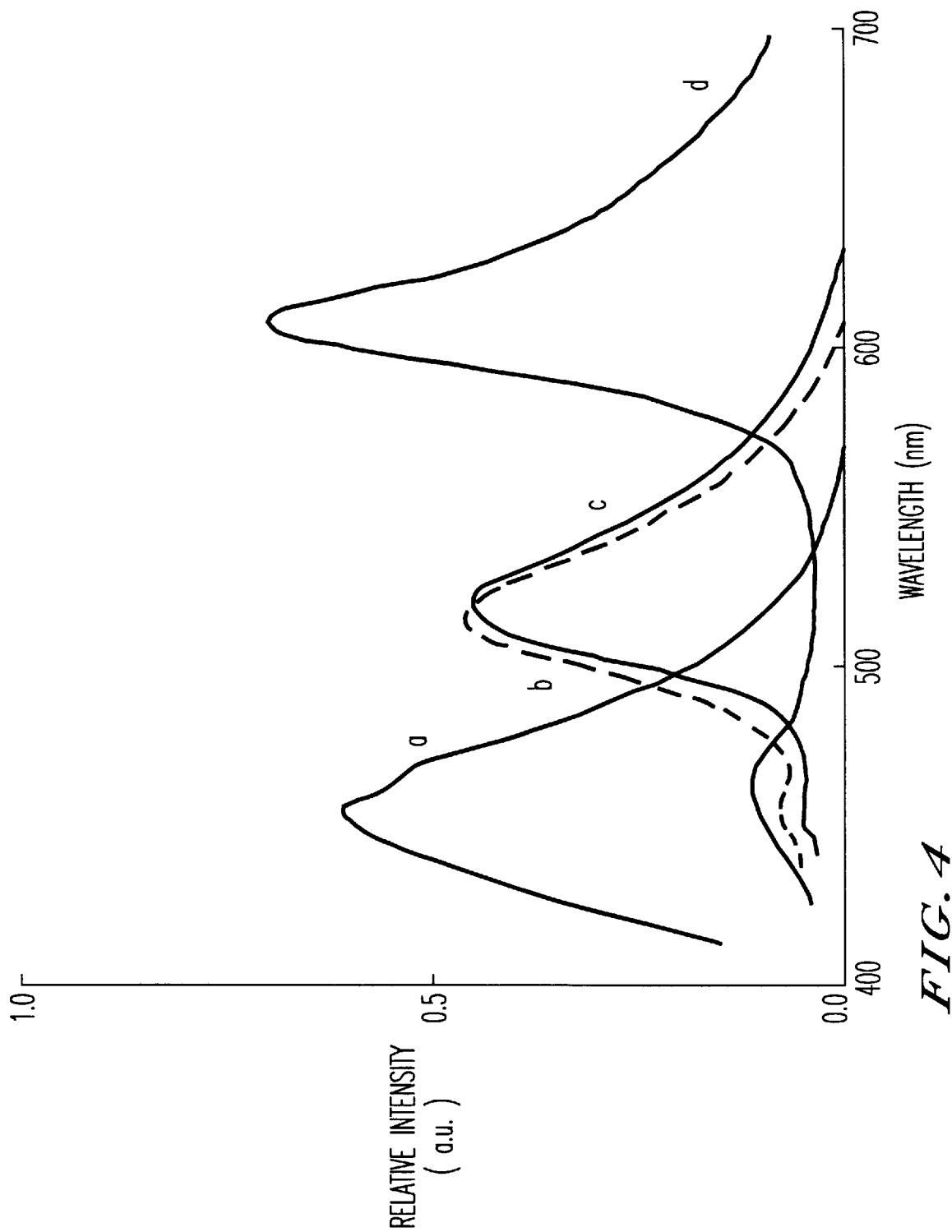
FIG. 4 is a graph showing a luminescence spectrum of each of a blue fluorescent pigment deposited long persistent phosphorescence silicate phosphor, a green fluorescent pigment deposited long persistent phosphorescence silicate phosphor, a yellow fluorescent pigment deposited long persistent phosphorescence silicate phosphor, and a red pigment deposited long persistent phosphorescence silicate phosphor of the present invention, when excited with an ultraviolet light with a wavelength of 365 nm.

FIG. 4 is a graph showing a luminescence spectrum of a europium-activated long persistent phosphorescence silicate phosphor on which a blue fluorescent pigment was deposited with a mixing ratio of 100 parts by weight of the silicate phosphor to 5 parts by weight of the blue fluorescent pigment (hereinafter referred to as the blue pigment deposited long persistent silicate phosphor), when excited with an ultraviolet light with a wavelength of 365 nm, indicated by a curve "a"; a luminescence spectrum of a long persistent silicate phosphor on which a green fluorescent pigment was deposited with a mixing ratio of 100 parts by weight of the silicate phosphor to 5 parts by weight of the green fluorescent pigment (hereinafter referred to as the green pigment deposited long persistent silicate phosphor), when excited with an ultraviolet light with a wavelength of 365 nm, indicated by a curve "b"; a luminescence spectrum of a long persistent silicate phosphor on which a yellow fluorescent pigment was deposited with a mixing ratio of 100 parts by weight of the silicate phosphor to 5 parts by weight of the yellow fluorescent pigment (hereinafter referred to as the yellow pigment deposited long persistent silicate phosphor), when excited with an ultraviolet light with a wavelength of 365 nm, indicated by a curve "c"; and a luminescence spectrum of a long persistent silicate phosphor on which a red fluorescent pigment was deposited with a mixing ratio of 100 parts by weight of the silicate phosphor to 5 parts by weight of the red fluorescent pigment (hereinafter referred to as the red pigment deposited long persistent silicate phosphor), when excited with an ultraviolet light with a wavelength of 365 nm, indicated by a curve "d".

Figure 5:
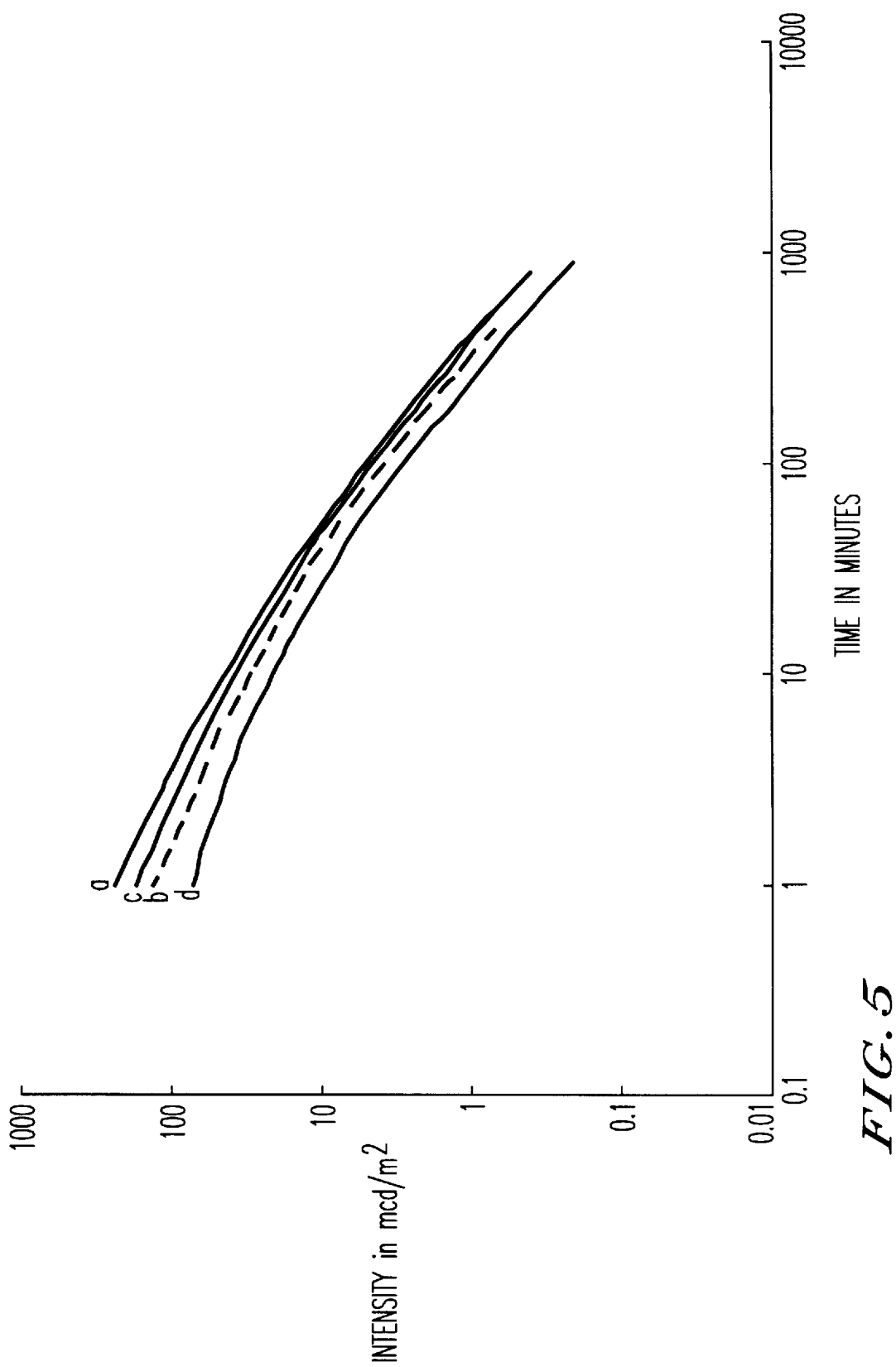
FIG. 5 is a graph showing the afterglow characteristics of each of the above-mentioned blue pigment deposited long persistent phosphorescence silicate phosphor, green pigment deposited long persistent phosphorescence silicate phosphor, yellow pigment deposited long persistent phosphorescence silicate phosphor, and red pigment deposited long persistent phosphorescence silicate phosphor, when excited with an ultraviolet light with a wavelength of 365 nm.

FIG. 5 is a graph showing the afterglow characteristics of each of the above-mentioned blue pigment deposited long persistent silicate phosphor, green pigment deposited long persistent silicate phosphor, yellow pigment deposited long persistent silicate phosphor, and red pigment deposited long persistent silicate phosphor, when irradiated with illuminance of 1000 lux for 5 minutes, using a xenon lamp, ultraviolet, and the irradiation was stopped for 1 minute.

Other features of this invention will become apparent in the course of the following description of exemplary embodiments, which are given for illustration of the invention and are not intended to be limiting thereof.

EXAMPLE 1

Predetermined amounts of $SrCO_3$, MgO, $SiO_2$, $Eu_2O_3$, $Dy_2O_3$ and $NH_4Cl$ were sufficiently mixed and placed in an alumina crucible and fired, using an electric furnace, in a reducing atmosphere of a mixed gas composed of 98% of nitrogen and 2% of hydrogen at 1,150° C. for 2 hours, whereby a fired product was obtained.

The thus obtained fired product was then lightly ground, washed with water, dried, and screened, whereby a silicate phosphor with a composition of $Sr_{1.995}MgSi_2O_7$: $Eu_{0.005}$, $Dy_{0.025}$, $Cl_{0.025}$ for use in the present invention was obtained.

FIG. 1 shows a luminescence spectrum of the thus obtained silicate phosphor when excited with an ultraviolet light with a wavelength of 365 nm. As shown in this luminescence spectrum, this silicate phosphor had a luminescence peak wavelength at 470 rm, with blue-luminescence and long persistent phosphorescence characteristics.

5 g of a commercially available red fluorescent pigment (Trademark "SINLOIHI COLOR F-13™" made by Shinloihi Corporation), having an excitation spectrum as indicated by a curve "d" in FIG. 2 and a luminescence spectrum as indicated by a curve "d" in FIG. 3, was mixed with 90 g of polyvinyl alcohol. This mixture was deposited on the surface of the particles of the above-mentioned silicate phosphor, whereby a long persistent phosphorescence phosphor with the deposition of the red fluorescent pigment thereon, having a red body color, (hereinafter referred to as the red pigment deposited phosphor) of the present invention was obtained.

This red pigment deposited phosphor had a luminescence spectrum as indicated by a curve "d" in FIG. 4, a main luminescence peak wavelength at 608 nm, with red luminescence. This red pigment deposited phosphor also had such long persistent afterglow characteristics as indicated by a curve "d" in FIG. 5.

EXAMPLE 2

Predetermined amounts of $SrCO_3$, $BaCO_3$, MgO, $SiO_2$, $Eu_2O_3$, $Dy_2O_3$ and $NH_4Cl$ were sufficiently mixed and placed in an alumina crucible and fired, using an electric furnace, in a carbon reducing atmosphere at 1,200° C. for 2 hours, whereby a fired product was obtained.

The thus obtained fired product was then lightly ground, washed with water, dried, and screened, whereby a silicate phosphor with a composition of $Sr_{0.445}Ba_{1.55}MgSi_2O_7$: $Eu_{0.005}$, $Dy_{0.025}$, $Cl_{0.025}$ for use in the present invention was obtained.

This silicate phosphor had a luminescence peak wavelength at 440 nm, with blue-luminescence and long persistent phosphorescence characteristics.

5 g of a commercially available blue fluorescent pigment (Trademark "P6-BL0519™" made by Magruder Color Company, Ltd.), having an excitation spectrum as indicated by a curve "d" in FIG. 2 and a luminescence spectrum as indicated by a curve "a" in FIG. 3, was mixed with 90 g of polyvinyl alcohol. This mixture was deposited on the surface of the particles of the abovementioned silicate phosphor, whereby a long persistent phosphorescence phosphor with the deposition of the blue fluorescent pigment thereon, having a blue body color, (hereinafter referred to as the blue pigment deposited phosphor) of the present invention was obtained.

This blue pigment deposited phosphor had a luminescence spectrum as indicated by a curve "a" in FIG. 4, a main luminescence peak wavelength at 455 nm, with blue luminescence. This blue pigment deposited phosphor also had such long persistent afterglow characteristics as indicated by a curve "a" in FIG. 5.

EXAMPLE 3

Predetermined amounts of $SrCO_3$, MgO, $SiO_2$, $Eu_{23}$, $Nd_2O_3$, and $NH_4Cl$ were sufficiently mixed and placed in an alumina crucible and fired, using an electric furnace, in a reducing atmosphere of a mixed gas composed of 97% of nitrogen and 3% of hydrogen at 1,200° C. for 3 hours, whereby a fired product was obtained.

The thus obtained fired product was then lightly ground, washed with water, dried, and screened, whereby a silicate phosphor with a composition of $Sr_{1.995}MgSi_2O_7$: $Eu_{0.005}$, $Nd_{0.025}$, $Cl_{0.025}$ for use in the present invention was obtained.

This silicate phosphor had a luminescence peak wavelength at 470 nm, with blue-luminescence and long persistent phosphorescence characteristics.

15 g of a commercially available green fluorescent pigment (Trademark "SINLOIHI COLOR FZ-5012™", made by Shinloihi Corporation), having an excitation spectrum as indicated by a curve "b" in FIG. 2 and a luminescence spectrum as indicated by a curve "b" in FIG. 3, was mixed with 100 g of polyvinyl alcohol. This mixture was deposited on the surface of the particles of the abovementioned silicate phosphor, whereby a long persistent phosphorescence phosphor with the deposition of the above green fluorescent pigment thereon, having a green body color, (hereinafter referred to as the green pigment deposited phosphor) of the present invention was obtained.

This green pigment deposited phosphor had a luminescence spectrum as indicated by a curve "b" in FIG. 4, a main luminescence peak wavelength at 515 nm, with green luminescence. This green pigment deposited phosphor also had such long persistent afterglow characteristics as indicated by a curve "b" in FIG. 5.

EXAMPLE 4

Predetermined amounts of $SrCO_3$, MgO, $SiO_2$, $Eu_2O_3$, $Nd_2O_3$, and $NH_4Cl$ were sufficiently mixed and placed in an alumina crucible and fired, using an electric furnace, in a reduction atmosphere of a mixed gas composed of 97% of nitrogen and 3% of hydrogen at 1,200° C. for 3 hours, whereby a fired product was obtained.

The thus obtained fired product was then lightly ground, washed with water, dried, and screened, whereby a silicate phosphor with a composition of $Sr_{2.995}MgSi_2O_8$: $Eu_{0.005}$, $Nd_{0.025}$, $Cl_{0.025}$ for use in the present invention was obtained.

This silicate phosphor had a luminescence peak wavelength at 460 nm, with blue-luminescence and long persistent phosphorescence characteristics.

10 g of a commercially available yellow fluorescent pigment (Trademark "SINLOIHI COLOR F15" made by Shinloihi Corporation), having an excitation spectrum as indicated by a curve "c" in FIG. 2 and a luminescence spectrum as indicated by a curve "c" in FIG. 3, was mixed with 95 g of polyvinyl alcohol. This mixture was deposited on the surface of the particles of the above-mentioned silicate phosphor, whereby a long persistent phosphorescence phosphor with the deposition of the above yellow fluorescent pigment thereon, having a yellow body color, (hereinafter referred to as the yellow pigment deposited phosphor) of the present invention was obtained.

This yellow pigment deposited phosphor had a luminescence spectrum as indicated by a curve "c" in FIG. 4, a main luminescence peak wavelength at 518 nm, with yellow luminescence. This yellow pigment deposited phosphor also had such long persistent afterglow characteristics as indicated by a curve "c" in FIG. 5.

The fluorescent pigment deposited long persistent phosphorescence phosphor of the present invention has a blue to red body color and exhibits exceedingly long blue to red afterglow characteristics, so that it is suitable for a wide variety of applications, not only indoors, but also outdoors. For example, it can be applied to the surfaces of various types of articles, mixed into plastics, rubber, polyvinyl chloride, other synthetic resins, glass, and the like, and used in molded bodies and fluorescent films, and can find widespread use in various types of signposts for traffic safety, such as traffic armbands, gloves for traffic control, reflective plates for cars, reflective hand flags, signal devices, highway signs, emergency ropes, footwear, safety umbrellas, canes for the blind, stickers, knapsacks, raincoats, and safety covers; visual indicators such as telephone dial covers, switches, non-skid strips for stairs, indoor guide signs for emergency evacuation, tires, mannequins, fire extinguishers, keys, doors, fluorescent lamps and display tapes; decorations such as artificial flowers, accessories, and interior plates; leisure goods such as fishing floats, toys, golf balls, ropes for dragnets, kites, artificial trees and shrubs, and jigsaw puzzles; timepieces such as clock dials and faces, hands, and gradations; office goods and office automation equipment such as writing equipment, desk pads, rulers, marker pens, seals, liquid crystal backing lights, solar cells, desk top calculators, printers, and ink; educational goods and machinery such as constellation plates, planet models, transparencies, musical instruments with keyboards, and maps; and construction materials such as concrete, guardrails, scales for construction work, metal fittings for manhole footholds, tiles, decorative sheets, surveying equipment and measuring tapes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the UNITED STATES is:

1. A long persistent phosphorescence phosphor comprising:

i) a europium-activated long persistent phosphorescence silicate phosphor of the formula (I),

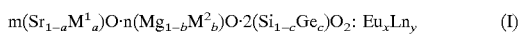

$$m(Sr_{1-a}M^1_a)O \cdot n(Mg_{1-b}M^2_b)O \cdot 2(Si_{1-c}Ge_c)O_2 : Eu_xLn_y \qquad (I)$$

wherein $M^1$ is Ba, $M^2$ is at least one element selected from the group consisting of Be, Zn and Cd, Ln is at least one element selected from the group consisting of Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn, $m(Sr_{1-a}M^1_a)O \cdot n(Mg_{1-b}M^2_b)O \cdot 2(Si_{1-c}Ge_c)O_2$ being a host material for the phosphor, Eu serving as an activator, and Ln serving as a coactivator, wherein
$0 \leq a \leq 0.8$,
$0 \leq b \leq 0.2$,
$0 \leq c \leq 0.2$,
$1.5 \leq m \leq 3.5$,
$0.5 \leq n \leq 1.5$,
$1 \times 10^{-5} \leq x \leq 1 \times 10^{-1}$ (g·atm per mole of the host material),
$1 \times 10^{-5} \leq y \leq 1 \times 10^{-1}$ (g·atm per mole of the host material), comprising at least one halogen atom selected from the group consisting of F, Cl, Br and I in an amount of $1 \times 10_{-5}$ to $1 \times 10_{-1}$ g·atm per mole of the host material; and ii) an organic fluorescent pigment which is deposited on the surface of said europium-activated long persistent silicate phosphor.

2. The long persistent phosphorescence phosphor of claim 1, wherein $1.7 \leq m \leq 3.3$.

3. The long persistent phosphorescence phosphor of claim 1, wherein Ln is at least one element selected from the group consisting of Dy, Nd, Tm, Sn, In, Bi and a mixture thereof.

4. The long persistent phosphorescence phosphor of claim 2, wherein Ln is at least one element selected from the group consisting of Dy, Nd, Tm, Sn, In, Bi and a mixture thereof.

5. The long persistent phosphorescence phosphor of claim 1, wherein said europium-activated long persistent silicate phosphor and said organic fluorescent pigment are present in a parts-by-weight ratio of 100:30 or less.

6. The long persistent phosphorescence phosphor of claim 1, wherein said europium-activated long persistent silicate phosphor is in the form of particles having an average particle size in a range of 5 to 100 μm.

7. The long persistent phosphorescence phosphor of claim 1, wherein $0.7 \leq n \leq 1.3$.

8. The long persistent phosphorescence phosphor of claim 1, wherein said phosphor has a one tenth persistence time of 10 msec or more.

9. The long persistent phosphorescence phosphor of claim 1, wherein $0 \leq a \leq 0.4$.

10. The long persistent phosphorescence phosphor of claim 1, wherein $0 \leq b \leq 0.1$.

11. The long persistent phosphorescence phosphor of claim 1, wherein $0 \leq c \leq 0.1$.

12. The long persistent phosphorescence phosphor of claim 1, wherein $1 \times 10^{-4} \leq x \leq 5 \times 10^{-2}$.

13. The long persistent phosphorescence phosphor of claim 1, wherein $1 \times 10^{-4} \leq y \leq 5 \times 10^{-2}$.

14. The long persistent phosphorescence phosphor of claim 1, wherein said amount of halogen atom is $1 \times 10^{-4}$ to $1 \times 10^{-2}$.

15. The long persistent phosphorescence phosphor of claim 6, wherein said average particle size is in the range of 5 to 50 μm.

16. The long persistent phosphorescence phosphor of claim 6, wherein said average particle size is in the range of 8 to 40 μm.

17. The long persistent phosphorescence phosphor of claim 1, wherein a luminescence spectrum distribution of said europium-activated long persistent silicate phosphor is at a shorter wavelength than an excitation spectrum distribution of said organic fluorescent pigment.

18. The long persistent phosphorescence phosphor of claim 1, wherein said europium-activated long persistent silicate phosphor is of a formula selected from the group consisting of:

$Sr_{1.995}MgSi_2O_7: Eu_{0.005}, Dy_{0.025}, Cl_{0.025}$;

$Sr_{0.445}Ba_{1.55}MgSi_2O_7: EU_{0.005}, Dy_{0.025}, Cl_{0.025}$;

$Sr_{1.995}MgSi_2O_7: Eu_{0.005}, Nd_{0.025}, Cl_{0.025}$; and $Sr_{2.995}MgSi_2O_8: Eu_{0.005}, Nd_{0.025}, Cl_{0.025}$.

19. A method of making a surface fluorescent comprising depositing on a surface, the long persistent phosphorescence phosphor of claim 1.

* * * * *